(12) United States Patent
Green et al.

(10) Patent No.: US 7,448,039 B2
(45) Date of Patent: Nov. 4, 2008

(54) METHOD AND SYSTEM FOR LOGGING TEST DATA

(75) Inventors: Jared Green, Redmond, WA (US); Weiyou Cui, Bellevue, WA (US); Mark A. Harris, Woodinville, WA (US); Grzegorz Swiatek, Redmond, WA (US); Kenneth Reppart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 960 days.

(21) Appl. No.: 10/632,518

(22) Filed: Aug. 2, 2003

(65) Prior Publication Data

US 2005/0027783 A1    Feb. 3, 2005

(51) Int. Cl.
*G06F 3/00* (2006.01)
(52) U.S. Cl. .................................. 719/310
(58) Field of Classification Search ............... 719/310; 702/108
See application file for complete search history.

(56) References Cited

U.S. PATENT DOCUMENTS

| | | | |
|---|---|---|---|
| 5,768,475 A * | 6/1998 | Godbole et al. ............ 706/45 |
| 6,230,198 B1 * | 5/2001 | Dawson et al. ............ 709/224 |
| 6,484,196 B1 * | 11/2002 | Maurille ............ 709/206 |
| 6,598,179 B1 * | 7/2003 | Chirashnya et al. ............ 714/37 |
| 6,769,079 B1 * | 7/2004 | Currey et al. ............ 714/45 |
| 6,842,870 B2 * | 1/2005 | Austen et al. ............ 714/48 |
| 7,065,556 B1 * | 6/2006 | Hickey et al. ............ 709/217 |
| 7,111,075 B2 * | 9/2006 | Pankovcin et al. ............ 709/246 |
| 2004/0028059 A1 * | 2/2004 | Josyula et al. ............ 370/396 |
| 2005/0028171 A1 * | 2/2005 | Kougiouris et al. ............ 719/318 |
| 2006/0059107 A1 * | 3/2006 | Elmore et al. ............ 705/64 |

FOREIGN PATENT DOCUMENTS

JP            08231615    *  3/1998

* cited by examiner

*Primary Examiner*—William Thomson
*Assistant Examiner*—Lechi Truong
(74) *Attorney, Agent, or Firm*—Workman Nydegger

(57) ABSTRACT

A method and system for logging messages in a test environment. Devices that display, output, store, or transmit log messages are instantiated as objects to log messages sent from a testing application. The testing application requests that a message be logged by a logger. The logger passes a formatted log message to a publisher. The publisher packages the log message in a trace object which is then published to each device that has requested messages of a type including the log message. The testing application need not be recompiled to cause log messages to be logged in a different manner.

49 Claims, 5 Drawing Sheets

METHOD AND SYSTEM FOR LOGGING TEST DATA

FIELD OF THE INVENTION

The present invention relates generally to computer systems, and more particularly to testing mechanisms.

BACKGROUND

Many programs go through extensive testing before they are released, in an attempt to eliminate bugs and improve performance. Often, testing is done ad-hoc. A tester creates a suite of tests based on past experience and/or previously encountered bugs. To create the suite of tests, the tester will often write a testing application that exercises the program in a variety of ways. This testing application is written such that at certain points, messages are logged to indicate success or failure of a particular test.

Testers often have different ideas as to what tests are important to perform and what data to collect from each test. Moreover, testers often create a proprietary format for logging messages. When it is determined that data should be logged in a different format and/or that different data should be collected, current logging mechanisms require re-writing and re-running the testing application. Furthermore, to interpret the data logged by a test in another way often requires creating another program to analyze the data. If a log does not include sufficient information, the testing application may need to be rewritten and rerun.

What is needed is a way to provide users with a uniform method and system for logging messages in a test environment. The method and system should be extensible and flexible to allow for changes to the way data is displayed, logged, or interpreted without requiring recompilation of a testing application. The method and system should log information suitable for detecting and eliminating bugs.

SUMMARY

Briefly, the present invention provides a method and system for logging messages in a test environment. In one aspect of the invention, devices that display, output, store, or transmit log messages are instantiated as objects to log messages sent from a testing application. The testing application requests that a message be logged by a logger. The logger passes a formatted log message to a publisher. The publisher packages the log message in a trace object (e.g., comprising a message) which is then published to each device that has requested messages of a type that includes the log message.

The devices comprise objects that may be instantiated after a test application has been created, without requiring that the test application be recompiled to log messages to the devices. The devices may be selected at run time through command-line options, through a database, through an environment variable or variables, or in other ways.

The logger includes interfaces that can interface with programming languages and/or models. Upon instantiation, the logger may customize its interface to one appropriate for a particular programming language or model.

In one aspect of the invention, the logging mechanism allocates memory upon instantiation. The logging mechanism then provides memory from its own pool in order to log messages. In some cases (e.g., when enough memory is free in the logging mechanism's pool of memory), this allows for logging to continue even if sufficient memory is not available in main memory. This may be useful, for example, in stress testing.

Information is logged that allows a hierarchy to be built from the logged messages. Many threads from many processes and machines may be logging messages to a single log file. Without ways of separating out what messages belong to which threads, debugging can be difficult. One aspect of the invention addresses this by providing a context entity and a run time information (RTI) entity. Then, identifiers that identify a thread's context and RTI entity are written each time a message is logged from the thread. This information can then be used to extract data relevant to a particular thread or group of threads.

A publisher that publishes log messages to devices formats the log messages in an extensible markup language (XML) format. Each device which receives the message may then obtain desired information from the formatted message and display, output, store, or transmit the message (or data derived from the message) appropriately.

Other advantages will become apparent from the following detailed description when taken in conjunction with the drawings, in which:

DETAILED DESCRIPTION

Exemplary Operating Environment

Figure 1:
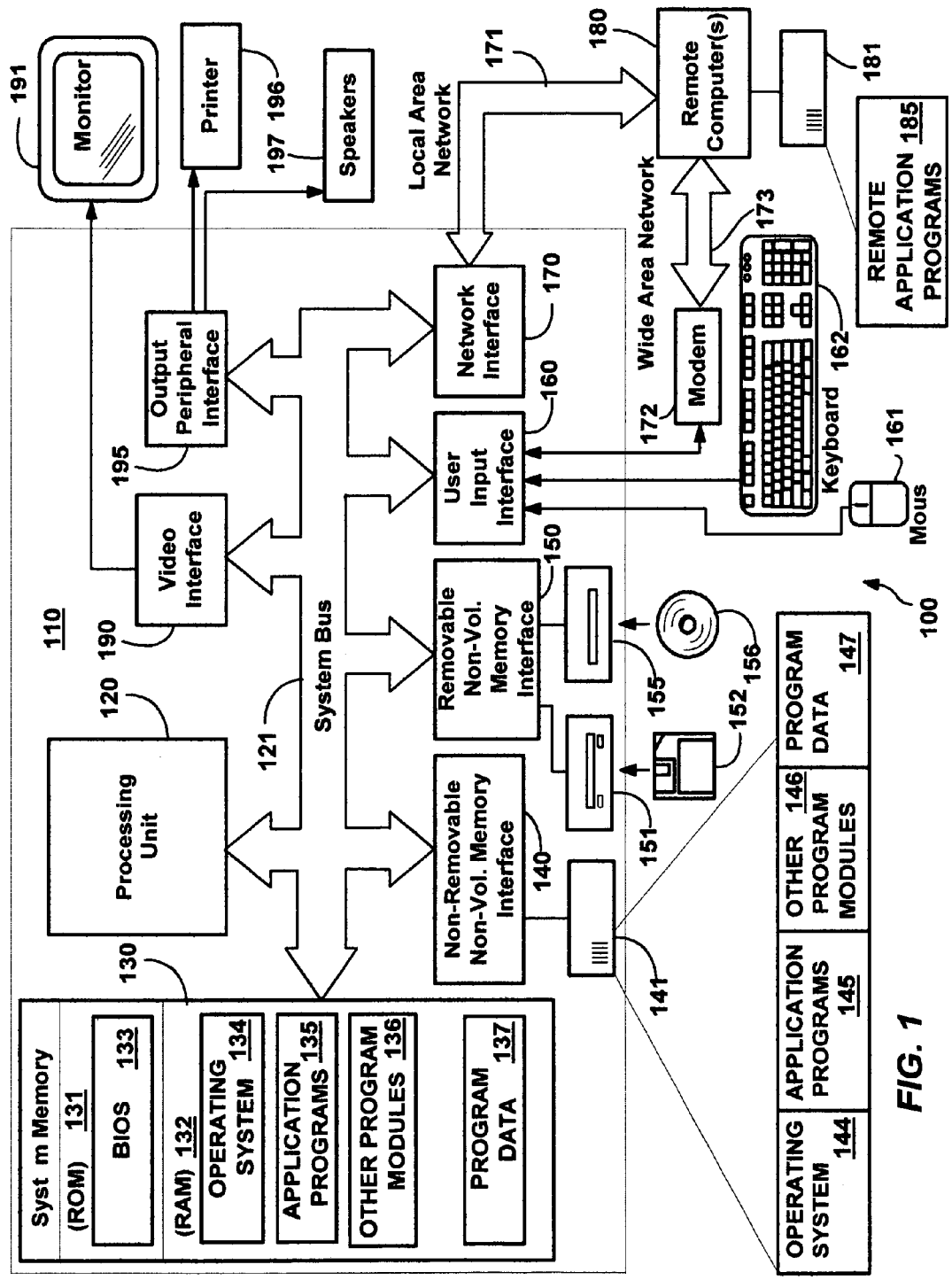
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of an handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Logging Test Data

Figure 2:
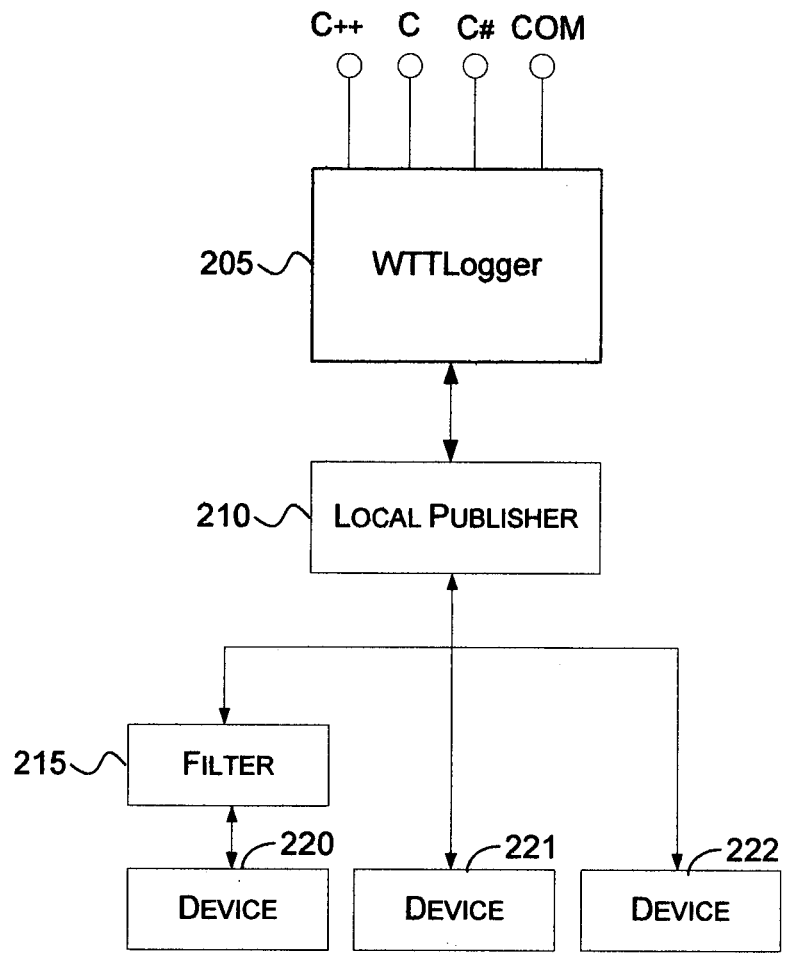
FIG. 2 is a block diagram representing components of a logging mechanism configured to log messages in accordance with an aspect of the invention.

FIG. 2 is a block diagram representing components of a logging mechanism configured to log messages in accordance with one aspect of the invention. Included in the logging mechanism is a logger component 205 (e.g., WTTLogger), comprising an object that exposes certain interfaces which are called by test applications that wish to log messages. In general, the logger component 205 receives a request to log a message, formats the message appropriately, and forwards the formatted message to a local publisher 215. There may be multiple instantiations of the logger component 205.

The logger component 205 can interface with various programming languages and/or models. Some common programming languages and/or models with which the logger component 205 can interface include C++, C, C#, and COM. The interfaces for these language and/or models may be implemented using one or more dynamic link libraries (DLLs) in a layered configuration as described in more detail in conjunction with FIG. 3. The present invention, however, is not limited to interfacing with these programming languages and/or models; rather, any other programming language and/or model could also be used to interface with the logger component 205. Each instantiated logger component 205 may define its own interface to work with a particular programming language and/or model.

A local publisher 210 receives requests to publish messages from each instantiated logger component 205. In one embodiment of the invention, there is one local publisher 210 for each process on a particular machine. In alternative embodiments of the invention, there may one local publisher per machine or more than one local publisher per process.

When initialized, the local publisher 210 allocates a buffer to be used in storing information associated with publishing messages. When the logger component 205 desires to publish a message, the logger component 205 may request memory from the local publisher 210. The local publisher 210 may then return to the logger component 205 a portion of the buffer it allocated upon initialization, to satisfy the memory request from the logger component 205. The use of already allocated memory helps in publishing messages when a machine upon which the local publisher 210 resides is otherwise low on memory.

The amount of memory allocated by the local publisher 210 may change during the course of a trace, or may be adjusted by user input or otherwise. If there is not enough memory to allocate or resize the buffer for the local publisher 210, the local publisher 210 may block or wait until more memory becomes available. For example, during stress testing, the memory available on a machine may vary greatly, e.g., a period of little or no available memory may be shortly followed by a period of a relatively large amount of available memory.

When requesting that a message be logged, a test may wait until after the message has been logged or the test may continue executing. Whether the test blocks until more memory is available depends on whether the test is executing synchronously or asynchronously with respect to the logging mechanism shown in FIG. 2. Generally, tests are run asynchronously with the logging mechanism, as synchronous execution may affect the manner in which the test executes. When a test executes asynchronously with respect to the logging mechanism shown in FIG. 2, a test may continue to execute even if the local publisher 210 is waiting to allocate memory (e.g., if the local publisher 210 does not have enough internal memory to publish the message). Requests to log messages that occur when insufficient memory is available will not be published to devices unless the local publisher 210 is eventually able to allocate sufficient memory.

In one embodiment of the invention, a test that runs synchronously with respect to the logging mechanism may be delayed when it requests that a message be logged and insufficient memory is available. Waiting for more memory to become available allows the test to resume executing when more memory becomes available instead of simply aborting.

The local publisher 210 sends a trace object corresponding to the message received from the logger component 205 to each of devices 220-222. A device comprises an object that can process a trace object in certain way. For example, a device may transform a received trace object into a formatted message suitable for display and then cause the formatted message to be displayed. A device may transform a trace object into data having a format that is suitable for storing in a database and may then make calls to store the data in the database. Some exemplary devices include a device that logs messages to a file in an XML format, a device that logs messages to a file in plain text, a device that logs messages to a standard console, a device that logs messages to a debugger console, a device that logs messages by sending them to another device on a network, and a device that logs messages to a database. Devices that log messages to consoles may format the messages using color coding to assist a tester in reading the messages, for example.

Instead of sending messages to devices, the local publisher 210 may send each message it receives to a customized object that determines what to do with each message. For example, an operating system may have its own methods for logging errors from applications. Instead of re-writing the functionality of the local publisher 210 for use in the operating system, the local publisher 210 may be configured to send each message to an object created by the operating system. This object may then process each message according to the design of the operating system. For example, the object may create devices similar to the devices described above and then send messages to the devices.

An aspect of the invention provides for a dynamic selection of the set of devices that will log messages. In the past, changing the behavior of logging required rewriting code in a testing program. An aspect of the present invention provides a mechanism by which devices may be instantiated dynamically and output from the test program may be directed to the instantiated devices. To receive messages from the local publisher 210, a device is registered with the local publisher 210. The device may also indicate what kind of messages (e.g., warnings, errors, breaks, and the like as described below) it wishes to receive. Thereafter, the device receives each message published by publisher 210 that meets the device's criteria. When starting the execution of a test application, a user may specify (e.g., through command line parameters, registry values, environment variables and the like as also described below) which devices should be registered with the local publisher 210.

It will be recognized that the variety of devices to which the local publisher 210 may send log messages is essentially unlimited, as many objects may be created to receive messages from the local publisher 210 and process the messages in a certain way. For example, a device may be created that logs only error messages, another device may be created that logs only warning messages, and another device may be created that logs only start and end test messages.

When the local publisher 210 has a message to publish to devices 220-222, the local publisher 210 formats the message in some way, such as using an extensible language, such as XML, and sends the formatted message (sometimes referred to as a trace object) to each of the devices. Each device may then extract information from the message and format the information appropriately for display, output, storage, or transmission. It will be recognized that using an extensible language such as XML provides many advantages over systems that use proprietary formats for transmitting messages. Some of these advantages include extensibility, being able to leverage tools that can write or read XML, not requiring custom translators to convert the data from one format to another, and providing uniform ways of accessing the data in the messages.

A filter (when one exists) is a process that is called when a log message is available. The filter process can determine that the message (or data derived from the message) should be forwarded to a device, that nothing should be forwarded to the device, and/or that other actions should be taken (e.g., notifying other processes that a test has started or completed). If a filter exists between the local publisher 210 and a device (e.g., the filter 215), instead of sending a message to the device, the local publisher 210 may instead notify the filter that a log message is available for logging. This notification may be accomplished through a callback, for example. The filter 215 may then perform processing and determine whether to forward the message (or data derived from the message) to a device (e.g., the device 220) or perform other processing based on the message. A filter may be added when a test is run and does not require the test application to be changed to write to the filter. A filter may have access to more data and methods of the local publisher 210 than a device does. A filter may ask the local publisher 210 for additional information regarding a message.

Configuring The Logging Mechanism

Configuring the logging mechanism to log to different devices may be accomplished in many ways. A user may start a testing program from the command line and utilize parameters to indicate to which devices to log messages. For example, in a test application called TestApp.exe, a user may instruct the logger component 205 to log to a debugger device, a console device, and a logfile device. The user may do this by typing the name of the test application followed by command line arguments that indicate the devices to which to log. The following is one example of how this may be done:

TestApp.exe /WTTLogDevStr:$Debugger; $Console; $LogFile:File="my file.xml"

Alternatively, or in addition, a user may provide a command line parameter that indicates a predefined test configuration as follows:

TestApp.exe /WTTPredefinedConfig:Stress

The logging configuration may then be located in a database, such as a registry, that indicates to which devices to log messages.

Alternatively, or in addition, a user may set an environment variable that indicates to which devices to log messages. Alternatively, or in addition, a user may hard code a configuration in the test application itself. It will be recognized that the above methods of indicating a logging configuration are illustrative and that other methods for indicating to which devices to log messages are also within the spirit and scope of the present invention.

When more than one method is used for indicating to which devices to log messages, an order may be followed to give one method precedence over another. For example, one order may give hard coded configurations precedence, followed by command line strings that include devices, command line strings that reference data in a database, and finally environment strings.

The following is some sample code written in the C programming language that shows the body of a test application called TestApp.

```
TestApp ( )
{
    HANDLE hLogger = INVALID_HANDLE_VALUE;
    HRESULT hr     = S_OK;
    hr = WTTLogCreateLogDevice(NULL, &hLogger);
/*
    Start tracing
*/
    hr = WTTLogStartTest(hLogger, "Test0001");
    hr = WTTLogTrace(hLogger, WTTLOG _MESSAGE, "This is
a test message");
/*
    Other message could be logged here
*/
    hr = WTTLogEndTest(hLogger, "Test0001", "PASS");
/*
    Clean up - this will delete the global logger object
*/
    hr = WTTLogCloseLogDevice(NULL, hLogger);
}
```

This code requests that a log device be created, requests a log start, requests that a message be logged, requests a log end, and requests that the log device be closed. Passing NULL in WTTLogCreateLogDevice indicates that the logging configuration should be obtained outside the test application (e.g., from the command line, an environment variable, or the registry).

XML Trace Object

Each time the local publisher 210 receive a request to publish a message, the local publisher 210 passes a trace object to each device depending on what types of messages should be sent to the device. In one implementation, the trace object is formatted in an XML binary format. Notwithstanding, the present invention is not limited to trace objects formatted in XML, but rather any suitable structure/format may be used for the trace object. The following sets forth some examples of information that may be sent in the trace object. Note that the following list of entities, containers, and elements (hereinafter sometimes collectively and individually referred to as trace objects) is not intended to be exhaustive; rather, it is intended to give some exemplary formats for some of the trace objects of the present invention. It will be recognized that other trace objects could be added and that the following trace objects could be modified without departing from the spirit or scope of the invention. Furthermore, the list of attributes for each of the following trace objects may include attributes that are optional or required and could be changed to meet a particular implementation without departing from the spirit or scope of the present invention.

Run Time Information (RTI) Entity. An RTI entity is used for a set of specific trace messages. An RTI entity provides information that identifies the requester of a trace. It has the following set of attributes:

| Machine | Name of the machine where the trace message takes place |
|---|---|
| ProcessName | Name of the process which generates such trace message |
| ProcessID | ID of the process which generates such trace message |
| ThreadID | ID of the thread which generates such trace message |

The following is a sample usage of the RTI entity.
<!ENTITY RTI35"<RTI Machine='ntdev-test1' ProcessName='mytest.exe' ProcessID='123' ThreadID='456'/>">

An identifier that identifies the RTI entity is inserted in each logged message. The RTI identifier together with the CTX identifier (described below), identify the thread, process, machine, test case, and context of a logged message.

Context (CTX) Entity. A context entity is used for a set of specific trace messages. It includes two attributes:

| TestContext | Test Context |
|---|---|
| ParentContext | Parent test context |

The following is a sample usage of the CTX entity:
<!ENTITY CTX12"<CTX CurrentContext='Test1' ParentContext='Root'/>">

The CTX entity identifies the context in which logging takes place. An identifier identifying the CTX is placed in each logged message. The CTX entity provides a field for identifying the current thread and the parent (if any) of the current test. The "parent" is selectable and is not fixed to being the actual parent of the thread. In other words, when creating a context and at other times, a thread can indicate which other thread (parent context) it wants its log messages to be associated with. This is useful for grouping related messages together for viewing or otherwise. For example, a log file may be used to log messages from many different processes running on various machines. Messages logged from one process may be spread throughout the log file. The CTX entity may be used to extract and group messages from one or more processes together so that the sequence of logging activities carried on by the one or more processes can be viewed without extraneous information (e.g., messages logged from other processes). The CTX entity may also be used to arrange the information in a hierarchical manner with the information logged from child threads shown hierarchically under the information logged from their corresponding parent threads.

The logging mechanism keeps track of the context in which a thread is executing. When a thread wants to change its context, it makes a call to the logging mechanism and gives a name of the new context. A lookup is then done to retrieve a numerical identifier that corresponds to the name of the new context. In this manner, the thread does not have to continually pass a handle (or identifier) to the logging mechanism each time the thread wants to log a message. In another embodiment of the invention, however, a thread obtains a handle of a context and passes the handle back to the logging mechanism each time the thread wants something logged via the context associated with the handle.

<Message> element. This element is associated with TraceLvlMsg, and it is used for trace messages, which should reside in a TEST container. By saying that the element is associated with TraceLvlMsg, it is generally meant that a publisher will send a trace object including the message element to devices that have indicated that they want to receive message elements. Below, other types of messages are associated with particular types. These messages will be delivered to devices that request that the corresponding type of message be delivered to them. The term "message" as used herein refers to any type of data that is logged and does not just refer to a string sent from the test application. The message element has one attribute, namely Msg:

| Msg | The actual message |
|---|---|

The following is a sample usage of the message element:

<Message Msg="This is trace message."
    CA="3645765387"
    LA="2645865411">
    &RTI35;
    &CTX12;
</Message>

CA stands for "called at" and indicates the relative time at which the logging mechanism was called. LA stands for "logged at" and indicates the relative time at which the logged message was logged. The CA and LA times may be relative to the time the logging started or may be "wall clock" times. The time between when the logging mechanism was called with a message and when the logging mechanism actually logs (publishes) the method may vary depending on whether the logging mechanism is running synchronously or asynchronously with respect to the calling program.

<Error> element. This element is associated with TraceLvlErr, and it is used for error messages, which reside in a TRACE container. The <Error> element includes the following attributes, some of which may be optional:

| File | File location of the trace message that takes place |
|---|---|
| Line | Line location in the file that the trace message takes place |
| ErrCode | Actual error code |
| ErrTxt | Error message |
| Msg | Additional text passed by user |

The following is a sample usage of the error element:

<Error File="mylib.cpp"
    Line="1213"
    ErrCode="0x00000005"
    ErrTxt="Access Denied"
    Msg="Open Port"
    CA="24356457457"
    LA="24356457522">
    &RTI35;
    &CTX12;
</Error>

<Assert> element. This element is associated with TraceLvlAssert, and it is used for assertions. The <Assert> element has the following elements, some of which may be optional:

| File | File location of the trace message that takes place |
| --- | --- |
| Line | Line location in the file that the trace message takes place |
| Msg | User supplied assertion message |

The following is a sample usage of the assert element:

```
<Assert File="mylib.cpp"
    Line="1213"
    Msg="This should never happen"
    CA="4364324643"
    LA="4364324733">
    &RTI35;
    &CTX12;
</Assert>
```

<InvParam> element. This element is associated with TraceLvlInvParam, and it is used for invalid parameters. The element includes two attributes:

| File | File location of the trace message that takes place |
| --- | --- |
| Line | Line location in the file that the trace message takes place |

The following is a sample usage of the invparam element:

```
<InvParam File="mylib.cpp"
    Line="1213"
    CA="43643636556"
    LA="43643636656">
    &RTI35;
    &CTX12;
</InvParam>
```

<BUG> element. This element is associated with TraceLvlBug, and it is used for logging specific information about a known bug. It includes the following attributes:

| DB | Name of the bug management database |
| --- | --- |
| ID | Identifier identifying the bug |

The following is a sample usage of the bug element:

```
<Bug DB="raid3\winv60"
    ID="12345"
    CA="32453463"
    LA="32453563">
    &RTI35;
    &CTX12;
</Bug>
```

<Break> element. This element is associated with TraceLvlBreak, and it is used for debug breaks. The <Break> element includes the following attributes:

| File | File location of the trace message that takes place |
| --- | --- |
| Line | Line location in the file that the trace message takes place |
| ErrCode | Actual error code |
| Msg | Error message |

The following is a sample usage of the break element:

```
<Break File="mylib.cpp",
    Line="1213",
    ErrCode="0x00000005",
    Msg="Access denied"
    CA="436456754"
    LA="436456854">
    &RTI35;
    &CTX12;
</Break>
```

<StartTest> element. This element is associated with TraceLvlStartTest, and it is used for marking the beginning of a specific test case. It includes the following attribute that contains the basic information of the test case:

| Name | Test case title |
| --- | --- |

The following is a sample usage of the starttest element:

```
<START_TEST Lvl="StartTest"
    Name="This is a sample automated test"
    CA="436436366346"
    LA="436436366546">
    &RTI35;
    &CTX12;
</START_TEST>
```

<EndTest> container. This container is associated with TraceLvlStartTest, and it is used for marking the end of a specific test case. <EndTest> container includes the following attributes that contain the basic information of the test case:

| Name | Test case name |
| --- | --- |
| Result | Passed, failed, or aborted |
| Repro | How to reproduce the test |

The following is a sample usage of the endtest container:

```
<EndTest Result="Passed"
    Repro="mytest.exe /param1 /param2"
    CA="5475689679"
    LA="5475689879">
    &RTI35;
    &CTX12;
    <Optional DB-related element>
</EndTest>
```

Other elements may also be included in a trace log including elements that indicate the entry into and exit from functions, elements that provide information for test case management, and the like.

A sample master log file follows:

```xml
<?xml version="1.0" ?>
<!DOCTYPE Common-Logging-Engine
[
    <!ENTITY &RTI35 "<RTI Machine='ntdev-test1'
ProcessName='mytest.exe' ProcessID='123' ThreadID='456' />">
    <!ENTITY CTX12 "<CTX TextContext='This is the first
test case' ParentContext='Root' />">
    <!ENTITY CTX23 "<CTX TextContext='This is the
second test case' ParentContext='Root' />">
    <!ENTITY log SYSTEM "log.xml">
]
>
<LOG>
    &log;
</LOG>
The log file referred to by &log is as follows:
    <StartTest Name="This is a sample automated test",
            CA="123456"
            LA="123458">
        &RTI35;
        &CTX12;
    </StartTest>
    <Message Msg="This is a trace message."
            CA="123460"
            LA="123466">
        &RTI35;
        &CTX12;
    </Message>
    <Message Msg="This is another trace message."
            CA="123486"
            LA="123488">
        &RTI35;
        &CTX12;
    </Message>
    <EndTest Name="This is a sample automated test",
            Result="Passed"
            Repro="mytest.exe /param1 /param2"
            CA="123500"
            LA="123508">
        &RTI35;
        &CTX12;
    </EndTest>
    <StartTest Name="Test71186"
            CA="123530"
            LA="123535">
        &RTI35;
        &CTX23;
    <StartTest>
    <Message Msg="This is a trace message from the second
test."
            CA="123560"
            LA="123566">
        &RTI135;
        &CTX23;
    </Message>
    <Error Lvl="Error"
            File="mylib.cpp"
            Line="1213"
            ErrCode="0x00000005"
            Msg="Access denied"
            CA="123566"
            LA="123569">
        &RTI35;
        &CTX23;
    </Error>
    <EndTEst Title="This is another automated test",
            Result="Failed"
            Repro="mytest.exe /param1 /param2"
            CA="123800"
            LA="123808">
        &RTI35;
        &CTX23;
    </EndTest>
```

Figure 3:
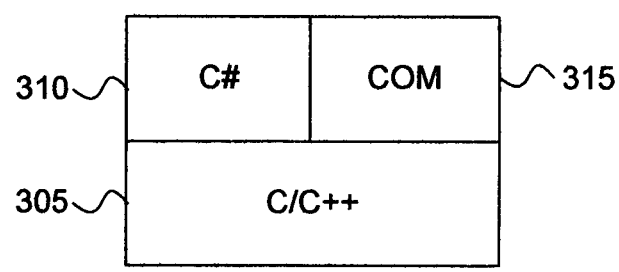
FIG. 3 is a block diagram representing layering of dynamic link libraries (DLLs) for interfacing with a logging mechanism in accordance with an aspect of the invention.

FIG. 3 is a block diagram representing layering of DLLs for interfacing with the logger component 205 in accordance with one aspect of the invention. The APIs exposed by each of the DLLs are similar to make the interface native to a particular language while allowing a data structure to be passed between DLLs.

Preferably, the layers are created such that each lower layer, such as C/C++ layer 305, has fewer dependencies than each higher layer (i.e., C# layer 310 and COM layer 315). This makes it easier to port the interface to other platforms and allows programs that only need to use a lower layer to use less memory. With componentization, this also allows a test to be executed on a system with only the functionality required by the test.

Figure 4:
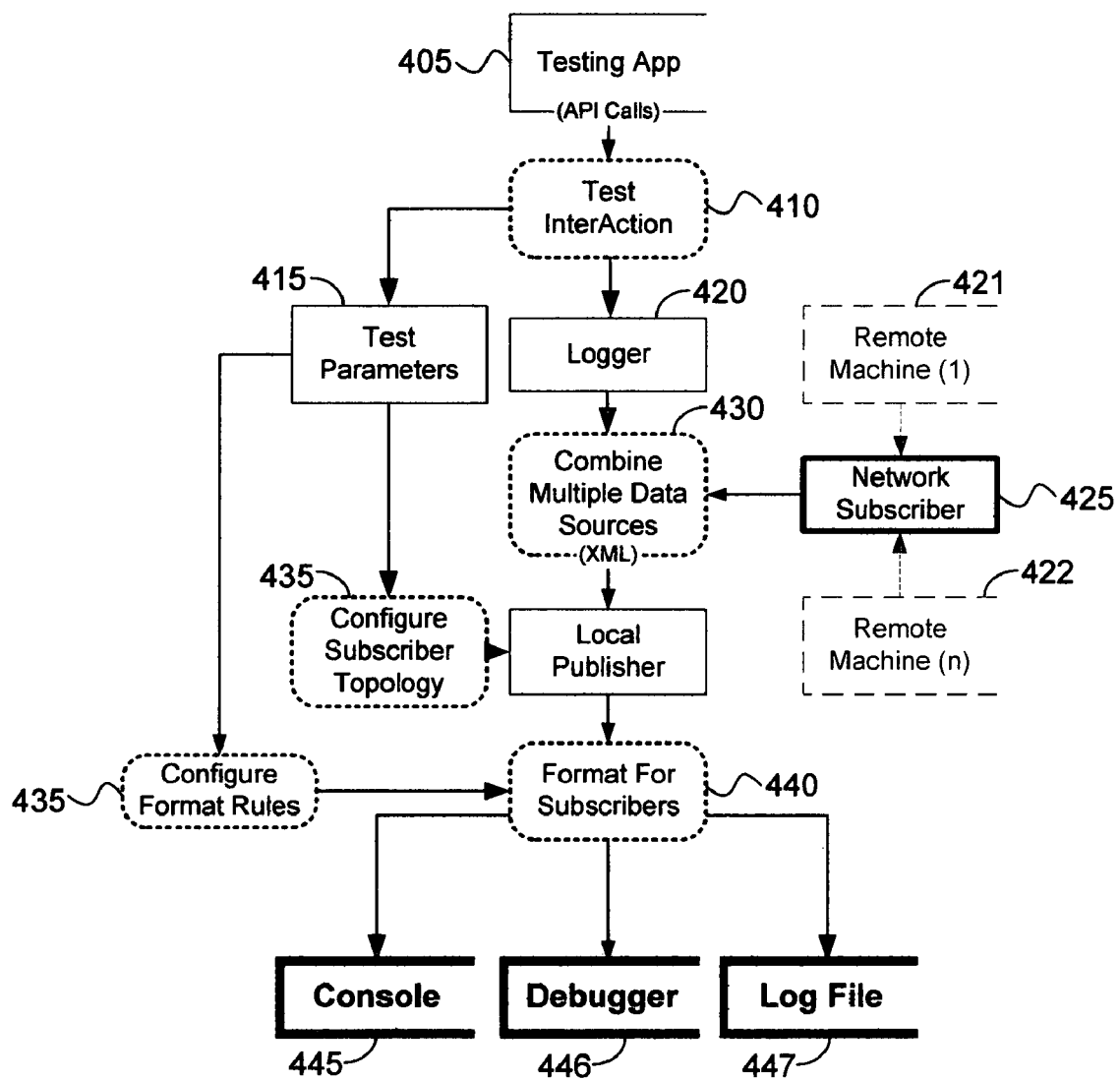
FIG. 4 is a dataflow diagram that represents interactions between components of the invention according to an aspect of the invention.

FIG. 4 is a dataflow diagram that represents interactions between components of the invention according to one aspect of the invention. The testing application 405 is an application that tests a particular application. (The code for one sample test application, TestApp, was shown previously.) In the process of testing the application, testing application 405 makes calls to logger 420 and provides an indication of where test parameters 415 may be found. Test parameters 415 are the parameters that indicate which devices are to be used in the test as previously described in conjunction with FIG. 2.

The logger 420 is called by testing application 405 to perform various logging activities as previously described. Logger is an instance of the logger component 205 as described in conjunction with FIG. 2. Remote machines 421-422 may also send messages to network subscriber 425 which forwards the messages to be combined with messages from logger 420 in block 430. Messages may be combined into a stream of messages based on called-at time, for example. Typically, remote machines 421-422 are machines that are reachable through a network. Remote machines 421-422 may publish log messages to a network publisher which sends messages to subscribed network subscribers, such as network subscriber 425. A remote machine with a network publisher is described in more detail in conjunction with FIG. 5.

In another embodiment of the invention, log messages may be combined from remote machines that have logged the messages locally. That is, a trace comprised of data derived from the log messages on a machine may be combined with a trace comprised of data derived from log messages on another machine after a test has completed. The log messages in the combined trace may be ordered by called-at time or logged-at time, for example.

At block 435, a subscriber topology is configured. This includes instantiating devices 445-447 according to the parameters indicated in test parameters 415. These instantiated devices 445-447 are then registered with local publisher.

At block 435, rules as to which devices receive which messages are configured. A user may desire that certain messages are logged to certain devices, but that certain other messages are not logged to those devices. For example, a user may desire to see errors, but may not wish to see warning messages. As another example, a user may wish to see assertion and warning messages, but not machine information messages. Indicating which messages should be sent to each device may be accomplished, for example, by using a sequence of bits (e.g, in a data structure) in which each bit corresponds to a particular type of data that is to be logged by a device. In one embodiment, any combination of the following may be logged to a device: user-defined messages, errors, assertions, invalid parameters, bugs, warnings, function entry, function exit, machine information, and rollup information (i.e., messages related to a group of test applications such as whether there were any failed tests within the group of test applications.)

At block 440, the messages are formatted for the devices. As described above, this typically involves formatting the messages into a trace object using a structured language, such as XML, and passing the trace object (or a copy of the trace object or a pointer thereto) to each of the devices. Each device may then use information in the object appropriately.

Figure 5:
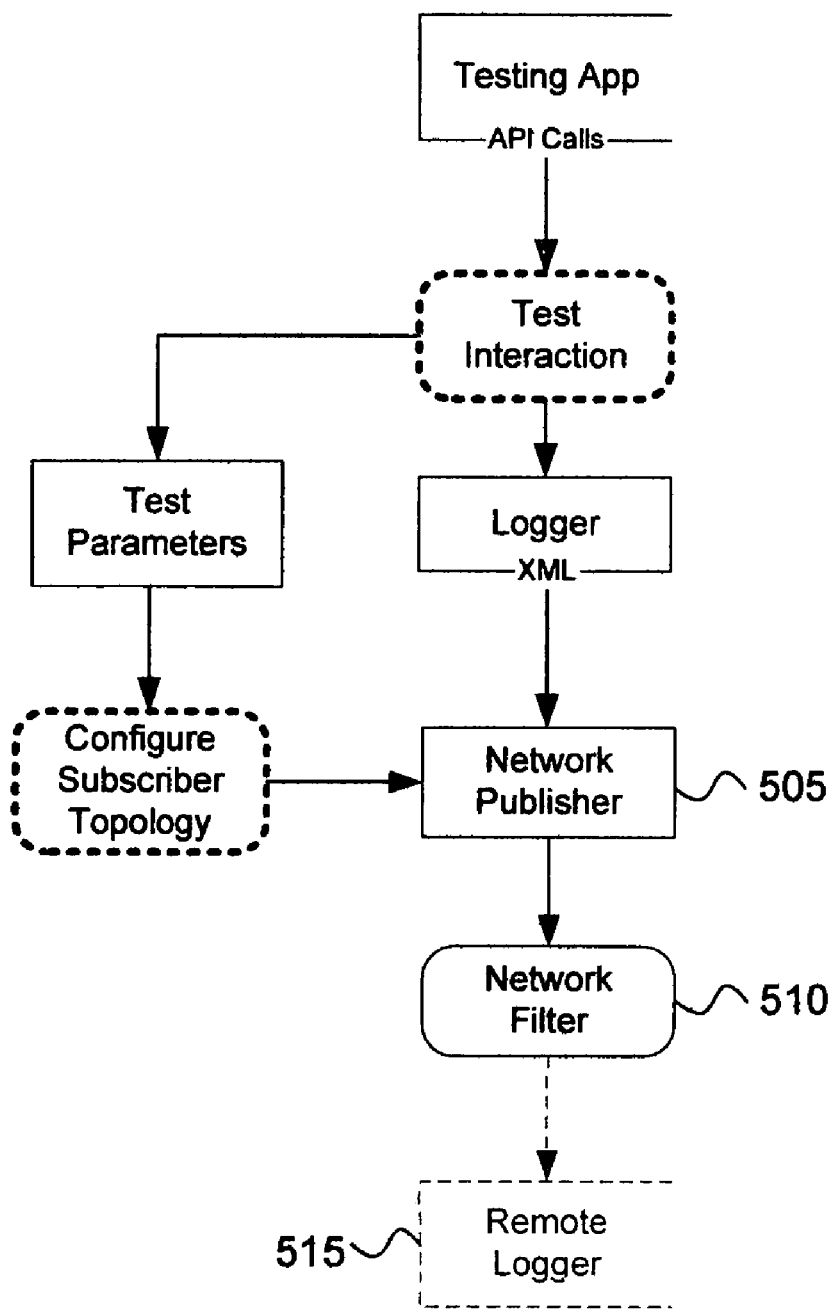
FIG. 5 is a dataflow diagram that represents interactions between components of the invention according to an aspect of the invention.

FIG. 5 is a dataflow diagram that represents interactions between components of the invention according to one aspect of the invention. In FIG. 5, network publisher 505 publishes messages to network filter 510 which then sends the messages to remote logger 515. The messages may then be conveyed to remote logger 515 through a network subscriber, such as network subscriber 425 of FIG. 4.

Figure 6:
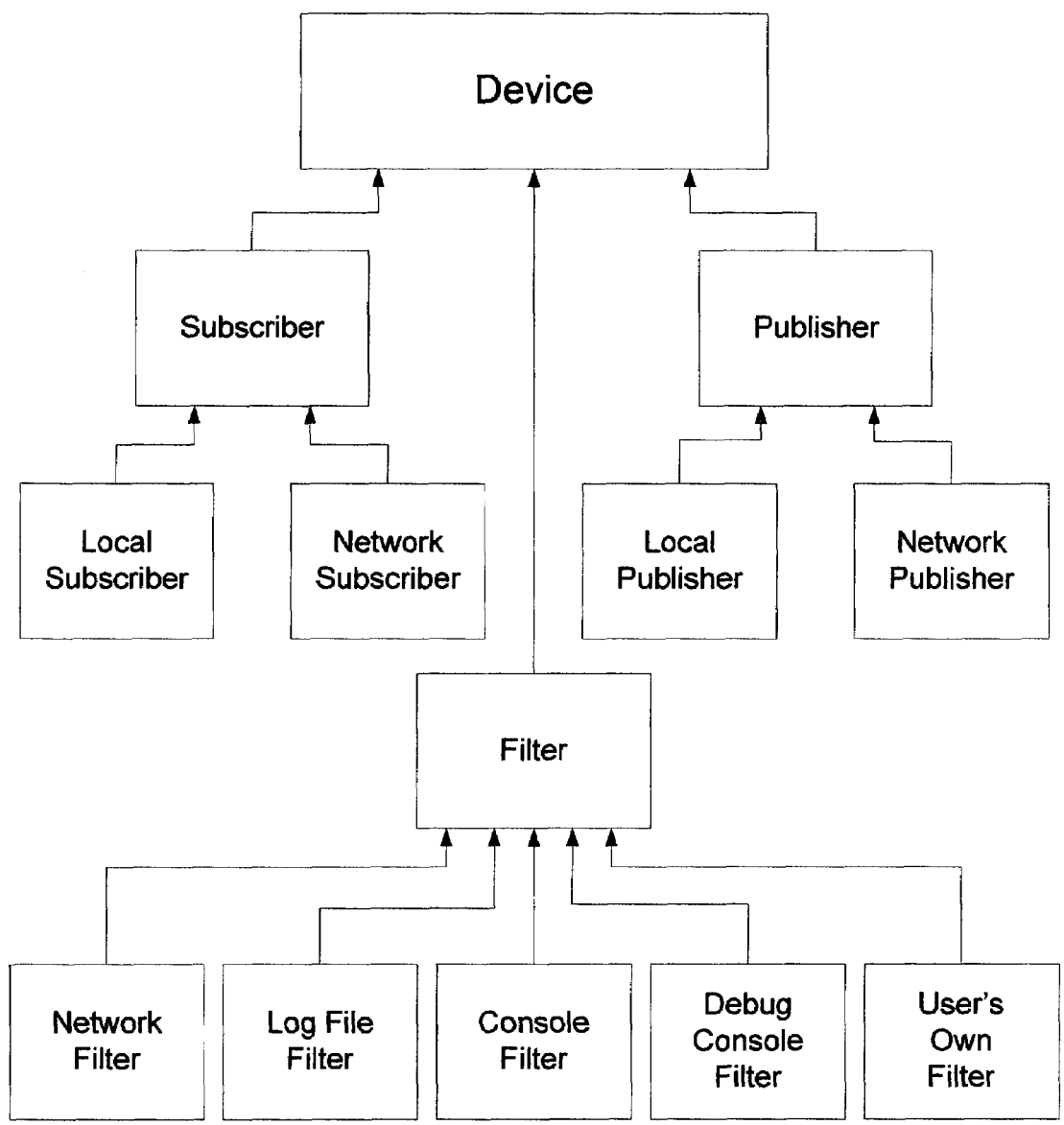
FIG. 6 is a block diagram representing an inheritance hierarchy in accordance with an aspect of the invention.

FIG. 6 is a block diagram representing an inheritance hierarchy for devices in accordance with one aspect of the invention. It will be recognized that different inheritance hierarchies could be used without departing from the spirit or scope of the invention.

As can be seen from the foregoing detailed description, there is provided an improved method and system for logging messages. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for logging messages during the testing of a software application to a selected set of one or more instantiated logging software objects separate from the application being tested, the method comprising:

receiving a configuration request, the configuration request indicating a selection of a set of one or more logging software objects separate from the application being tested that are to be instantiated for logging messages in a format different than the format used by the application being tested, the configuration request further indicating a plurality of configuration settings for each logging software object, the configuration settings including which type of information is to be logged by the logging software object and the format of the information that is to be logged, the information type, format type and members of the selected set of logging software objects having each been dynamically entered by a computer user;

instantiating the set of one or more logging software objects according to the received configuration request, each logging software object of the set being individually instantiated according to the logging software format and type of information that is to be logged indicated in the configuration request;

receiving a request to log a message from the application being tested; and publishing the message to the dynamically selected set of one or more logging software objects defined in the configuration request, the publishing comprising creating a trace object that includes the message formatted in a uniform format that is utilized by each logging software object selected by the computer user to receive the logging messages.

2. The method of claim 1, wherein the trace object is formatted in accordance with an extensible markup language (XML).

3. The method of claim 1, wherein each logging software object is associated with an indication of the types of messages logged by the logging software object.

4. The method of claim 3, wherein publishing the message further comprises sending a pointer to each logging software object that logs messages of a type associated with the message, the pointer pointing to memory that includes the trace object.

5. The method of claim 1, wherein the configuration request is included in a command line parameter associated with an application that requests logging of one or more messages.

6. The method of claim 5, wherein the command line parameter indicates that the set of logging software objects to which to log messages is in a database.

7. The method of claim 6, wherein the database comprises a registry.

8. The method of claim 1, wherein the configuration request is included in an environment variable.

9. The method of claim 1, further comprising calling a filter to indicate that the message is available to be logged.

10. The method of claim 9, wherein the filter is called through a callback function.

11. The method of claim 9, further comprising providing a notification by the filter that a test has completed.

12. The method of claim 9, further comprising processing the message to determine whether to send the message or data derived from the message to a logging software object.

13. The method of claim 1, wherein the request to log a message comes from a current thread.

14. The method of claim 13, wherein publishing the message comprises providing a context identifier that identifies a context of the current thread.

15. The method of claim 14, wherein the context identifier further identifies a context of a parent thread associated with the current thread.

16. The method of claim 1, wherein publishing the message comprises providing information that uniquely identifies the thread.

17. The method of claim 16, wherein the information comprises an identifier that identifies a machine on which the current thread executes, a name of a process that spawned the current thread, an identifier that identifies the process, and an identifier that identifies the thread.

18. The method of claim 1, wherein receiving the configuration request occurs after an application that requests to log the message has been compiled, such that the application is not required to be recompiled to publish messages to the set of one or more logging software objects.

19. The method of claim 1, wherein the message is published on a first machine and wherein the request to log the message is received from a second machine.

20. The method of claim 19, further comprising combining a request to log a first message from the first machine with a request to log a second message received from the second machine before publishing the message on the first machine.

21. A computer-readable storage medium having computer-executable instructions for performing the method of claim 1.

22. A system for logging messages during the testing of a software application to a selected set of one or more instantiated logging software objects separate from the application being tested, the system comprising:

a processor a logger having an interface configured to;

receive a configuration request to log a message, the configuration request indicating a selection of a set of one or more logging software objects separate from the application being tested that are to be instantiated for logging messages in a format different than the format used by the application being tested, the configuration request further indicating a plurality of configuration settings for each logging software object, the configuration settings including which type of information is to be logged by the logging software object and the format of the information that is to be logged, the information type, format type and members of the selected set of logging software objects having each been dynamically entered by a computer user; and instantiate the set of one or more logging software objects according to the received configuration request, each logging software object of the set being individually instantiated according to the logging software format and type of information that is to be logged indicated in the configuration request;

a local publisher configured to receive a log message from the logger; and a set of one or more logging software objects configured to log messages published by the local publisher to the dynamically selected set of one or more logging software objects defined in the configuration request, the publishing comprising creating a trace object that includes the message formatted in a uniform format that is utilized by each logging software object selected by the computer user to receive the logging messages.

23. The system of claim 22, further comprising a filter configured to receive a notification when the local publisher publishes a message.

24. The system of claim 23, wherein the filter determines whether to forward the message or data derived from the message to one of the logging software objects.

25. The system of claim 23, wherein the logger receives requests to log messages from an application and wherein the filter provides a notification when the application has completed.

26. The system of claim 23, wherein the filter is activated through a callback.

27. The system of claim 22, wherein the interface provides access to methods associated with the logger, the interface being customized to operate with a programming language or programming model.

28. The system of claim 27, wherein the programming model comprises a component object model (COM).

29. The system of claim 22, wherein the local publisher allocates a buffer when the local publisher is instantiated.

30. The system of claim 29, wherein the local publisher allocates memory from the buffer to receive the log message.

31. The system of claim 22, wherein the local publisher publishes a log message in an extensible markup language (XML) and places the published log message in the trace object.

32. The system of claim 22, further comprising an application configured to request that messages be logged via the logger.

33. The system of claim 32, wherein the application operates asynchronously with respect to the logger.

34. The system of claim 33, wherein the application continues executing even if there is insufficient memory to log the message.

35. The system of claim 32, wherein the application operates synchronously with respect to the logger.

36. The system of claim 32, wherein the set of one or more logging software objects is selected after the application is compiled.

37. The system of claim 22, wherein each logging software object is configured to transform a received log message for display, output, storage, or transmission.

38. The system of claim 22, further comprising a reader configured to read a trace comprised of data derived from the log messages and to display the trace in a hierarchical manner.

39. A computer-implemented method for logging messages during the testing of a software application to a selected set of one or more instantiated logging software objects separate from the application being tested, the method comprising:

receiving a configuration request, the configuration request indicating a selection of a set of one or more logging software objects separate from the application being tested that are to be instantiated for logging messages in a format different than the format used by the application being tested, the configuration request further indicating for each logging software object, which type of information is to be logged by the logging software object, the configuration request, including the format, type of information, and members of the selected set of logging software objects, having been dynamically entered by a computer user;

instantiating the set of one or more logging software objects according to the received configuration request, each logging software object being associated with an indication of the types of messages logged by the logging software object;

receiving a request to log a message from the application being tested; and publishing the message to the dynamically selected set of one or more logging software objects defined in the configuration request, the publishing comprising:

creating a trace object that includes the message formatted in a uniform format that is utilized by each logging software object selected by the computer user to receive the logging messages; and sending a pointer to each logging software object that logs messages of a type associated with the message, the pointer pointing to memory that includes the trace object.

40. The method of claim 39, wherein selecting the set of one or more logging software objects to receive log messages comprises passing a parameter via a command line that is associated with an application configured to request logging of one or more messages.

41. The method of claim 39, wherein the parameter indicates that an indication of the set of one or more logging software objects is in a database.

42. The method of claim 39, wherein selecting the set of one or more logging software object to receive log messages comprises passing information via an environment variable.

43. The method of claim 39, wherein selecting the set of one or more logging software objects to receive log messages comprises a combination of passing a parameter via a command line and passing information via an environment variable.

44. The method of claim 39, wherein the trace object is formatted in accordance with an extensible markup language (XML).

45. The method of claim 39, further comprising calling a filter to indicate that the message is available to be logged.

46. The method of claim 39, wherein publishing the data comprises providing a context identifier that identifies a context of a thread that sent the request and a context identifier that identifies the context of another thread associated with the thread.

47. The method of claim 39, wherein publishing the message comprises providing information that uniquely identifies the thread, the information comprising an identifier that identifies a machine on which the thread is executing, a name of a process that spawned the thread, an identifier that identifies the process, and an identifier that identifies the thread.

48. The method of claim 39, wherein the data is published on a first machine and wherein the request to log a message is received from a second machine.

49. The method of claim 39, wherein registering each logging software object in the set with a publisher comprises indicating what type of message or types of messages to publish to the device.

* * * * *